April 28, 1953  H. M. OLSON  2,636,792
STEEL PISTON RING
Filed Nov. 27, 1950
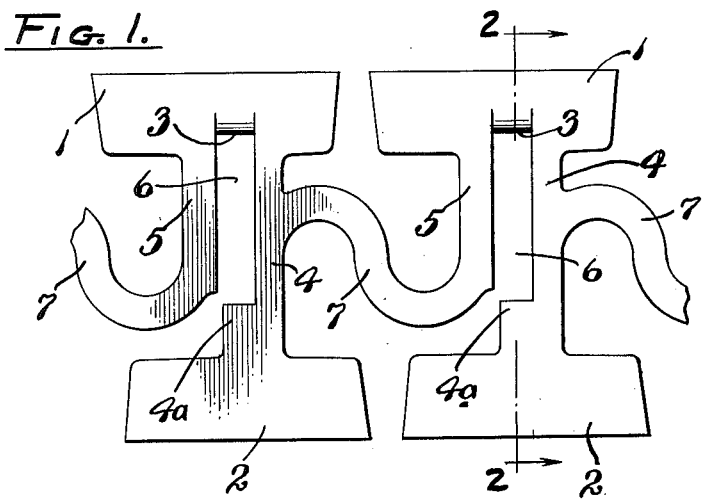
Fig. 1.
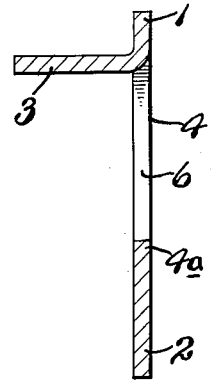
Fig. 2.
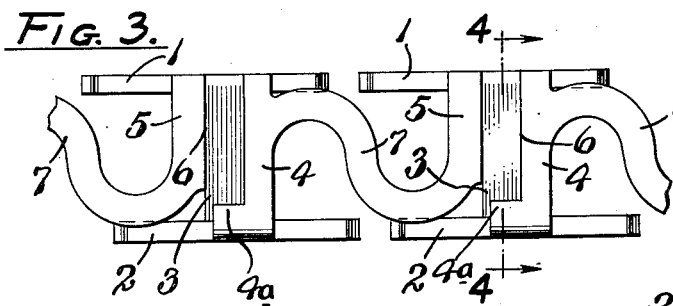
Fig. 3.
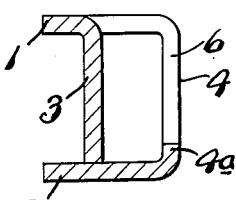
Fig. 4.
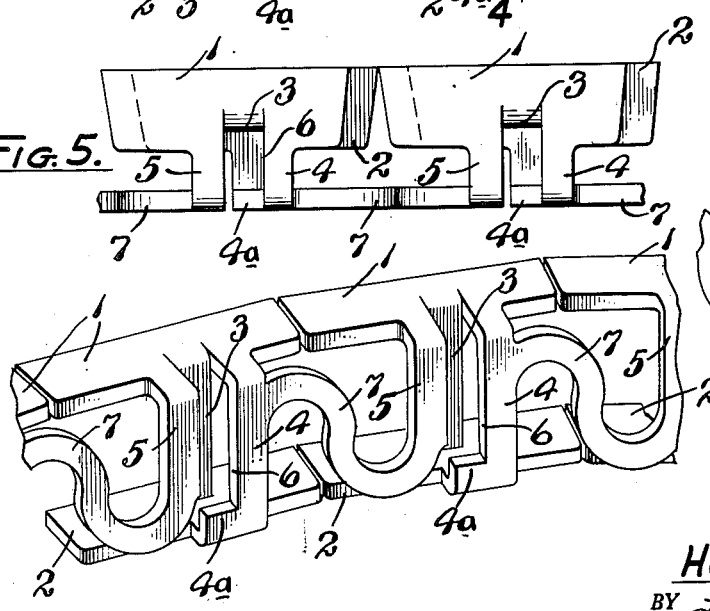
Fig. 5.
Fig. 6.
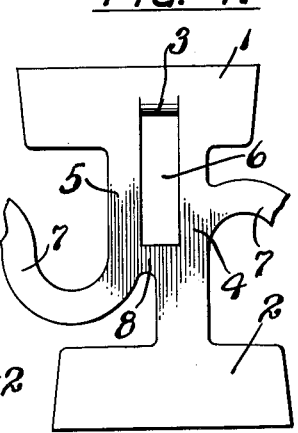
Fig. 7.
INVENTOR.
HOLLY M. OLSON
BY *Liverance and Van Antwerp*
ATTORNEYS Patented Apr. 28, 1953

2,636,792

UNITED STATES PATENT OFFICE 2,636,792

STEEL PISTON RING

Holly M. Olson, Muskegon, Mich., assignor to Sealed Power Corporation, Muskegon, Mich., a corporation of Michigan Application November 27, 1950, Serial No. 197,793

4 Claims. (Cl. 309—45)

The present invention relates to piston rings, and more particularly to steel piston rings each ring being made from a length of flat thin metal and having structure such that it can be contracted circumferentially and the diameter reduced when installed within a cylinder in which used, such steel piston rings being used in the lower or oil grooves of pistons of internal combustion engines for conserving lubricating oil which otherwise would pass by the piston upwardly to or toward the combustion chamber, resulting in the loss thereof and fouling of cylinders from the burning or decomposition of the oil under high temperatures.

It is an object and purpose of my invention to provide a particularly novel, practical, readily manufactured and efficient piston ring of the type stated in which, when the ring is in use in the cylinder of an internal combustion engine, land segments of the ring, spaced from each other, and in large numbers circumferentially are in two series, one spaced from the other around the ring, such segments at adjacent ends when the ring is compresesd and contracted, being in close proximity to each other thereby providing oil scraping lands bearing against the walls of the cylinder.

An understanding of the invention may be had from the following description, taken in connection with the accompanying drawing, in which, Fig. 1 is a fragmentary plan view of the blank, after the first operation thereon, from which the ring of my invention is made.

Fig. 2 is a transverse section, substantially on the plane of line 2—2 of Fig. 1.

Fig. 3 is an inner or rear elevation of a fragmentary portion of the ring when the opposed ring lands have been turned to parallel spaced relation with respect to each other, after the second operation of forming the ring.

Fig. 4 is a transverse section, substantially on the plane of line 4—4 of Fig. 3.

Fig. 5 is a fragmentary plan view of the ring structure shown in Fig. 3.

Fig. 6 is a fragmentary perspective view from the inner or rear side of the ring after the final formation step of manufacture has been completed to make the ring in circular form and with adjacent ends of the land segments brought closer together, and Fig. 7 is a fragmentary plan, similar to Fig. 1, of a slightly modified or different form of the blank from which the ring of my invention is made.

Like reference characters refer to like parts in the different figures of the drawing.

The ring blanks are made from sheet metal, preferably steel. From elongated, relatively narrow or ribbon lengths of metal, a ring, in length, slightly greater than the inner circumference of the wall of a cylinder in which the ring is to be used is made. By means of suitable punch and die operations, a continuous blank of metal of predetermined length is fabricated, as shown in Fig. 1, having two opposed consecutive series of land segments 1 and 2 which, at their ends, are spaced from each other. Such segments are of a generally trapezoidal form as shown, and the land segments 1 at one side of the blank are slightly staggered or out of line with the segments 2 at the other side thereof.

Such segments are integrally connected in pairs at their inner edges by transverse ties of metal from each of which a post or strut 3 is struck integral at one end with each land segment 1, the other end of the strut being free. Such struts or posts extend at right angles from the land segments 1 with which they are connected. The struts or posts 3 are struck or cut from the transverse ties between the opposite land segments 1 and 2 of each pair, providing spaced members 4 and 5 between which is a longitudinal slot 6. Such slot is produced by the cutting and turning of the posts 3 at right angles to the plane of the blank. In the blank form, as shown in Fig. 1, the parts 5, integrally connected at one end, one to each land segment 1, does not reach to the other land segment 2, but the opposite connecting part 4 extends between opposed land segments 1 and 2 and is widened as at 4a at the inner end of the slot 6. From the inner end of each of the parts or members 5, a connecting section or tie element 7 of a generally S-form extends to the part 4 which connects the next adjacent segments 1 and 2, integrally joining therewith between said segments. The connectors 7 may be also designated as having the form of a double ogee curve.

In Fig. 7, a slightly different structure of the blank is shown, the inner end of the slot 6 not reaching to the open space left in the blank when metal is cut away to form the connecting members 7, so that the wider portion 4a of the transverse connecting member 4 between opposed lands 1 and 2 is integrally connected by a short tie 8 with the adjacent member 5 and also with the S-shaped connector 7 at the juncture of such parts 5 and 7.

The blank ring form thus produced has the lands 1 and 2 bent to one side of the parts 4 and 5 between them, providing two series of land segments 1 and 2 in different planes spaced from each other, with the struts or posts 3 extending from the segments 1 to the opposite segments 2 as shown in Fig. 4.

The ring is completed with this operation except for a permanent straining and contraction of the connecting members 7 from the shape shown in Fig. 3 to that shown in Fig. 6, shortening them circumferentially thereby contracting the ring and bringing the adjacent ends of the segments 1 and 2 close together. And of course the connectors 7 are also shaped so that the completed ring takes a circular form.

When thus constructed, the exterior diameter of the piston ring at the outer or bearing edges of the segments 1 and 2 will be slightly greater than the interior diameter of the cylinder in which the ring is to be used. When the ring is installed in a cylinder of the proper size to receive it, it is further contracted circumferentially bringing the adjacent ends of the segments 1 and 2 closer together and as close substantially as they can be brought without interfering contact engagement. This provides a tension in the ring due to the circumferentially contracted ring being under strain which when relieved, as when the ring is removed from its cylinder, will result in the ring taking its initial larger circumference from which it is compressed and contracted when installed in a cylinder. The yielding takes place in the parts 4, 5 and 7 when the ring is circumferentially compressed and contracted in a cylinder.

The piston ring produced as described is very readily and easily manufactured in a substantially continuous process. The tension of the ring may be governed by increasing or diminishing the width of the parts 4, 5 and 7. Ample strength for the passage of oil collected through the ring to the bottom of a piston ring groove is provided. The opposed land segments 1 and 2 are held from bending, vibrating or fluttering, each pair of opposed segments 1 and 2 having a post or strut 3 between them which is located between the inner and outer edges of the segments. The structure is very practical and effective in use and readily and economically manufactured.

The claims define the invention which is to be considered comprehensive of all forms of structure coming within their scope.

I claim:

1. A piston ring of thin flat metal comprising, two series of generally horizontal land segments located end to end in the same plane, with adjacent ends of successive land segments around the ring in close proximity to each other, a second series of land segments located in the same generally horizontal plane spaced from the first series of segments and parallel thereto, a connecting member integral with each of the segments of the first mentioned series extending to and integrally connected with a land segment of the second mentioned series of segments, a second member connected with each segment of the first mentioned series of segments integral therewith extending toward but terminating short of the opposite connected segment, spaced from the adjacent connecting member, and an integral curved connecting tie connecting the end of said last mentioned member with the connecting member between the next adjacent pair of land segments.

2. A structure as defined in claim 1, and a strut integral with each segment of the first mentioned series of segments extending therefrom to the opposite segment of the second series, said strut, at the end thereof connecting it with its segment of the first mentioned series being located between the two members integral with each of said land segments of the first series which extend toward an associated segment of the second series, one thereof being integrally connected therewith.

3. A structure as defined in claim 1, said curved tie members having a generally S-shape and located generally horizontal, and said tie members and the members to which they are integrally connected being yieldable to permit circumferential contraction of the piston ring to bring adjacent ends of the land segments in each series closer together.

4. In a piston ring made from thin flat metal, having two spaced series of separated land segments, said segments in each series being located end to end in the same plane around the ring, and the two series lying substantially parallel to each other, the land segments of said two series providing substantially opposite successive pairs of segments around the ring, and a connecting member integral with the land segments of each pair of segments extending between them, the improvement comprising, a second member integrally connected with each of the land segments of one of said series extending therefrom toward but short of the land segment connected therewith, and spaced from and parallel to the member which integrally connects the two segments of each pair, and ties, one integral with the inner end of each of said second members extending therefrom to and integrally connected with the member which integrally connects the next adjacent pair of land segments, located in the curved plane of the ring at its inner side and in the same plane with said members, said ties and said second members resiliently yielding upon circumferential compressive force applied to the ring in the direction of the circumference of the ring, whereby the land segments of both series at adjacent ends thereof are brought into closer proximity upon said compression of the ring.

HOLLY M. OLSON.

References Cited in the file of this patent

UNITED STATES PATENTS

| Number | Name | Date |
|---|---|---|
| 2,293,681 | Engelhardt | Aug. 18, 1942 |
| 2,346,896 | Bowers | Apr. 18, 1944 |
| 2,421,175 | Zahodiakin | May 27, 1947 |